United States Patent
Pinguet et al.

(10) Patent No.: US 8,201,458 B2
(45) Date of Patent: Jun. 19, 2012

(54) MEASURE OF QUANTITIES OF OIL AND WATER IN MULTIPHASE FLOWS

(75) Inventors: Bruno Pinguet, Lormes (FR); Paul Guieze, Fontenailles (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 74 days.

(21) Appl. No.: 12/682,271

(22) PCT Filed: Oct. 14, 2008

(86) PCT No.: PCT/US2008/079845
§ 371 (c)(1),
(2), (4) Date: Aug. 3, 2010

(87) PCT Pub. No.: WO2009/049315
PCT Pub. Date: Apr. 16, 2009

(65) Prior Publication Data
US 2011/0036177 A1    Feb. 17, 2011

Related U.S. Application Data

(60) Provisional application No. 60/979,673, filed on Oct. 12, 2007.

(51) Int. Cl.
*G01F 1/74* (2006.01)
(52) U.S. Cl. .................................................. 73/861.04
(58) Field of Classification Search ............... 73/152.18, 73/861.04, 863.03, 861.52
See application file for complete search history.

(56) References Cited

U.S. PATENT DOCUMENTS

| | | | | |
|---|---|---|---|---|
| 4,470,311 | A | * | 9/1984 | Southwell .................. 73/861.69 |
| 5,576,495 | A | * | 11/1996 | Vetterick .................... 73/861.04 |
| 5,956,132 | A | * | 9/1999 | Donzier ........................ 356/133 |
| 7,942,065 | B2 | * | 5/2011 | Xie ............................ 73/861.04 |

FOREIGN PATENT DOCUMENTS

| EP | 0333939 | 9/1989 |
|---|---|---|
| EP | 1617202 | 9/2009 |

* cited by examiner

*Primary Examiner* — Jewel V Thompson
(74) *Attorney, Agent, or Firm* — Matthias Abrell; Darla Fonseca; Jeff Griffin

(57) ABSTRACT

A method, system, apparatus and computer program product for determining values of flow rates of components of a liquid hold up of a gaseous and liquid (water and oil) multiphase flow in an oil well. Including measuring total quantities of flow (Qtot), gas (Qgas) and liquid phase (Qliq) with a multiphase flow meter. Disposing an inlet of a core sampler inside a main pipe of the oil well at a place where a concentration of the liquid phase is greater than an average concentration of the liquid phase in the main pipe, to obtain a derived sample having a greater concentration of oil and water than the average concentration. Measuring quantities of water (Qwater) and oil (Qoil) of the derived sample. And calculating from Qwater, Qoil and Qliq, quantities of water and oil in the flow.

18 Claims, 6 Drawing Sheets

MEASURE OF QUANTITIES OF OIL AND WATER IN MULTIPHASE FLOWS

CROSS REFERENCE TO RELATED DOCUMENTS

The present invention claims benefit of priority to U.S. Provisional Patent Application Ser. No. 60/979,673 of Bruno PINGUET and Paul GUIEZE, entitled "MEASURE OF QUANTITIES OF OIL AND WATER IN MULTIPHASE FLOWS," filed on Oct. 12, 2007, the entire contents of which are hereby incorporated by reference herein.

FIELD OF THE INVENTION

The present invention generally relates to devices and methods for improving the accuracy of measured values of quantities of liquids, in particular oil and/or water in a multiphase flow including a gaseous phase and a liquid phase. More particularly the present invention aims at improving the accuracy of the measured values of quantities as output by a multiphase flow meter. Multiphase flow meters are apparatus for measuring the flow rate of a fluid including a gaseous phase and a liquid phase. A particular application of the invention relates to the measurement of the various phases of a multiphase fluid mixture from an oil well.

DISCUSSION OF THE BACKGROUND

Current multiphase flow meters do not achieve good results when the gas ratio of a multiphase flow becomes significant.

This is illustrated by the trumpet shape curve shown in FIG. 1 that shows a graphic representing the typical relative error rate of the measured values of liquid (or oil or water) fraction flow as a function of the gas volume fraction (GVF). The curve shows that for gas volume fraction (GVF) greater than 85%, the relative error rate becomes greater than about 5% and becomes unpredictable when the gas volume fraction (GVF) becomes greater than 95%.

One of the known techniques to address this issue is to separate a large quantity of gas from the multiphase flow upstream of the flow meter and therefore getting a lower ratio of gas in the flow. Then it becomes possible to get a significant accuracy for each of the three phases. Due to low pressure at surface condition, gas is more present in the multiphase flow than any other phases. Thus, separating gas from liquid phase requires the use of bulky equipment set upstream of the multiphase meter. This is inconsistent to the target for which multiphase flow meters were devised which was to eliminate the separator and of the complexity of use thereof.

Another way of dealing with the problem of accuracy of the measurement of the flow of the different phase is to make a partial separation of the gas from a main line of oil, water and gas using a gas diversion line. Some of the gas is diverted from the main line upstream of the multiphase meter but it is important to mention that still some gas is flowing through the main line of the multiphase meter.

This partial separation requires a gas to be substantially perfectly dry to avoid losing some of the liquid through the gas diversion line. The consequence is that in this type of configuration, the issue of gas quality (entrainment of liquid inside the gas) becomes as problematic as with a normal separator and the same problems of carry over or carry under are present, these two phenomena being related to a poor separation of the gas and liquid phases due either to one predominant phase flowing fast or lack of contrast of density, such as in Heavy Oil leading in the first case (i.e., carry over), to have some droplets going through the gas line, and in the second case (i.e., carry under) some bubbles going through the oil or water line. To cope with this issue, some manufacturers include additional sensors to control or measure the dryness of the extracted gas. Obviously, this inclusion of an additional sensor to measure or control dryness does not lead toward reduction and simplification of the multiphase flow meters. It leads to complexity and higher cost.

Another way to handle important error rate in multiphase flow measurements is to provide upstream of the multiphase flow meter a retention section for loading the multiphase flow meter with some liquid and release it in a controlled manner with the gas in a certain proportion to be able, first to reduce the relative gas content and second to get a better accuracy on the liquid flow rate from the multiphase flow meter. For example, Framo Engineering, and AGAR Corporation are among the first companies who designed respectively mixer (or retention) device and specific separation device upstream of the multiphase meter to handle this type of situation. As mentioned previously this leads to costly and bulky equipment.

In addition it is to be noted that the equipment to divert gas from the multiphase flow or for adding liquid phase to the multiphase flow require the separation or conditioning equipment to be designed for the expected flow rate. Obviously, the expected flow rate cannot be guaranteed for the entire life of a well, which may be over 20-50 years.

The market of multiphase flow meters is segmented into three main types of multiphase flow meters, a wet gas multiphase flow meter known as Type I flow meter, for measuring only the gas phase flow of the multiphase flow, multiphase flow meters known as type II capable to measure liquid and gas, and multiphase flow meters type III capable to measure and distinguish the 3 phases, i.e., oil or condensate, water, and gas.

In spite of the market segmentation, it is fundamentally the same accuracy of measurement problem present in all flow meter types. This issues is usually present at high Gas Volume Fraction (GVF) and therefore it is the same pathology in terms of accuracy, which is provided by any meters in the full range of GVF and water liquid ration (or ratio) (WLR).

SUMMARY OF THE INVENTION

The above and other needs and problems are addressed by the present invention, which in a first aspect, provides a method for determining the values of flow rates of each of the components of a liquid hold up of a multiphase flow circulating in a main pipe of an oil well, the pipe comprising a central line, the multiphase flow including a gaseous phase and liquid phases, the liquid phases including in particular water and oil, the method including measuring a total quantity of the flow (Qtot), a total quantity of the gas (Qgas) and a total quantity of the liquid phase (Qliq) of the flow using a multiphase flow meter.

The method includes: disposing an inlet of a core sampler inside the main pipe, the inlet comprising a central axis, at a place where a concentration of the liquid phase in the flow is greater than an average concentration of the liquid phase in the main pipe, to obtain a derived sample, the derived sample having a greater concentration of oil and water than an average concentration in the main pipe; measuring a quantity of water (Qwater) and a quantity of oil (Qoil) of the derived sample; and calculating from the measured quantity of water (Qwater) and quantity of oil (Qoil) of the derived sample and from the total quantity of the liquid phase (Qliq) measured by the multiphase flow meter, the quantities of water and oil in the multiphase flow.

In an embodiment of the first aspect, the inlet of the core sampler is disposed in an outer part of a curved part of the main pipe, the central axis of the inlet being in the outer part of the main pipe, the outer part of the main pipe being a volume of the main pipe wherein a radius of curvature of a line parallel to the central line of the main pipe is greater than the radius of curvature of the central line.

In another embodiment of the first aspect, the inlet of the core sampler is disposed immediately at the output of the curved part of the main pipe, the central axis of the inlet of the core sampler being in a part of the main pipe including a line parallel to the central line of the main pipe, the parallel line having a part in the outer part of the curved part of the main pipe.

In another embodiment of the first aspect, measuring the quantity of water (Qwater) and the quantity of oil (Qoil) of the derived sample further includes: discriminating oil, water, and gas by means of an optical discriminator of oil, water and gas, inserted in the derived sample and obtaining signals from the discriminator indicating whether a tip of the discriminator is perceiving oil, water or gas; and processing signals issued by the optical discriminator for outputting the values of the quantities of oil and water from the liquid phase of the derived sample.

In another embodiment of the first aspect, the optical discrimination of oil, water and gas is made by discriminating the refractive indexes with an Optical Probe Discriminator (OPD), adapted to discriminate between refractive indexes of oil, water and gas.

In yet another embodiment of the first aspect, the OPD is inserted in a liner in a sealed connection with the core sampler, the liner having at least at the place where a tip of the OPD is inserted an inner diameter small enough for allowing the water and oil to circulate in plugs in the liner by capillarity effect.

In another embodiment of the first aspect, the OPD is inserted in a cell of Paul Guieze, the cell having an inlet of the cell in a sealed connection with the core sampler through a liner, a tip of the discriminator being inserted in an internal flowing line of the cell having a diameter small enough for allowing the water and oil to circulate in plugs in the flowing line by capillarity effect.

In an alternative embodiment of the first aspect, an outlet of the liner is within the main pipe.

In another embodiment of the first aspect, an outlet of the Paul Guieze cell, or an outlet of a liner connected to the outlet is within the main pipe.

In a second aspect, the invention provides an equipped section of a main pipe of an oil well, the section comprising a central line. The section includes a multiphase flow meter including a sensor part positioned inside the equipped section for sensing flow rates of a multiphase flow, including a gaseous phase and liquid phases (or a liquid phase), the liquid phases including in particular water and oil, the multiphase flow circulating in the section of the main pipe. The section also comprises a processing means coupled to the sensor part for processing data coming from the sensor part, having outputs to deliver signal(s)1 representing the values of the total flow of fluid, the total flow of the gaseous phase and the total flow of the liquid phases circulating in the main pipe, and a transmission means for transmitting the signals representing values of the rates of the flows of the total flow of fluid, the total flow of the gaseous phase and the total flow of the liquid phases. The section further includes: a core sampler having an inlet inside the main pipe for capturing a part of the multiphase flow, the inlet having a central axis; a liner in a sealed connection with the core sampler; a means for maintaining the core sampler at a place where a concentration of the liquid phase in the flow is greater than an average concentration of the liquid phase in the main pipe, to obtain a derived sample. The section also includes a means for measuring a quantity of water (Qwater) and a quantity of oil (Qoil) of the derived sample coming from the liner. The means to measure the Qwater and Qoil includes a sensing tip positioned for sensing the derived sample and issuing a signal varying in accordance with what is sensed by the sensing tip; and a calculating means coupled with the sensing tip for deriving from the sensed signal of the sensing tip the quantity of water (Qwater) and the quantity of oil (Qoil) of the derived sample. The calculating means is further coupled to an output of the processing means of the multiphase flow meter delivering the signal representative of the total quantity of liquid in the multiphase flow to derive from the received values the quantity of oil and water in the multiphase flow.

In an embodiment of the second aspect, the means for maintaining the inlet of the core sampler maintain it in an outer part of a curved part of the main pipe, the central axis of the inlet being in the outer part of the main pipe.

In another embodiment of the second aspect, the means for maintaining the inlet of the core sampler maintain it immediately at the output of the curved part, the central axis of the inlet of the core sampler being in a part of the main pipe including a line parallel to the central line of the main pipe, the parallel line having a part in the outer part of the curved part of the main pipe.

In another embodiment of the second aspect, the means for measuring a quantity of water (Qwater) and a quantity of oil (Qoil) of the derived sample include an optical discriminator of oil, water and gas, the sensing tip thereof discriminating between oil, water or gas, being inserted in a passage of the liner or of a device connected to the liner having a diameter small enough for the derived sample being circulated in plugs.

In another embodiment of the second aspect, the optical discriminator is an Optical Probe Discriminator (OPD) adapted to discriminate between refractive indexes of oil, water and gas by discriminating their respective refractive indexes. OPDs are described below.

In another embodiment of the second aspect, the liner is in sealed connection with a Paul Guieze cell, the tip of the OPD being inserted in a passage of the cell having the diameter small enough for the derived sample being circulated in plugs.

In yet another embodiment of the second aspect, an output of the liner is inside the equipped section.

In an alternative embodiment of the second aspect, an output of the Paul Guieze cell or an output of a liner connected to the output of the cell is inside the equipped section.

In a third aspect, the invention provides a method for determining an oil quantity from a multiphase flowmeter including a processing part of data acquired by a sensor part of the multiphase flowmeter, the method including introducing in the processing part a value representing GOR1 or WLR1; processing the introduced value with data acquired by the sensor part of the multiphase flowmeter; computing two relative errors, a first relative error for computing Qoil by the first member of the following equation:

$$Qoil_{LC} = (1 - WLR) \cdot Qtot_{LC} \cdot (1 - GVF) = Qtot_{LC} \frac{GVF}{GOR1}$$

and a second relative error for computing Qoil with the second member of the equation, wherein the first and second members are on the two sides of the = sign in the equation, and determining a value of the relative errors in both cases; choosing the member of the equation giving the lowest error rate; and computing Qoil with the chosen member to issue the value of Qoil. In the above equation, Qoil, is quantity of oil, WLR is water liquid ratio, Qtot is the flow rate of the whole flow (quantity expressed in mass or volume of the whole multiphase flow per unit of time), GVF is gas volume fraction, GOR is gas liquid ratio and subscript "LC" means at line conditions.

Still other aspects, features, and advantages of the present invention are readily apparent from the entire description thereof, including the figures, which illustrate a number of exemplary embodiments and implementations. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION

Various embodiments and aspects of the invention will now be described in detail with reference to the accompanying figures. The terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited. Throughout this application, the subscript "LC," associated with some parameters, means at line conditions.

The solution of problems addressed herein, as heretofore proposed by manufacturers, is based only on flow handling and does not review or address the problem in a global way, based on the definition of the different parameters used presently to monitor the flow rate in order to obtain the best accuracy of measurements. We have reviewed and addressed the problem of accuracy of the measurement of a multiphase flow by coming back to the fundamentals.

Figure 1:
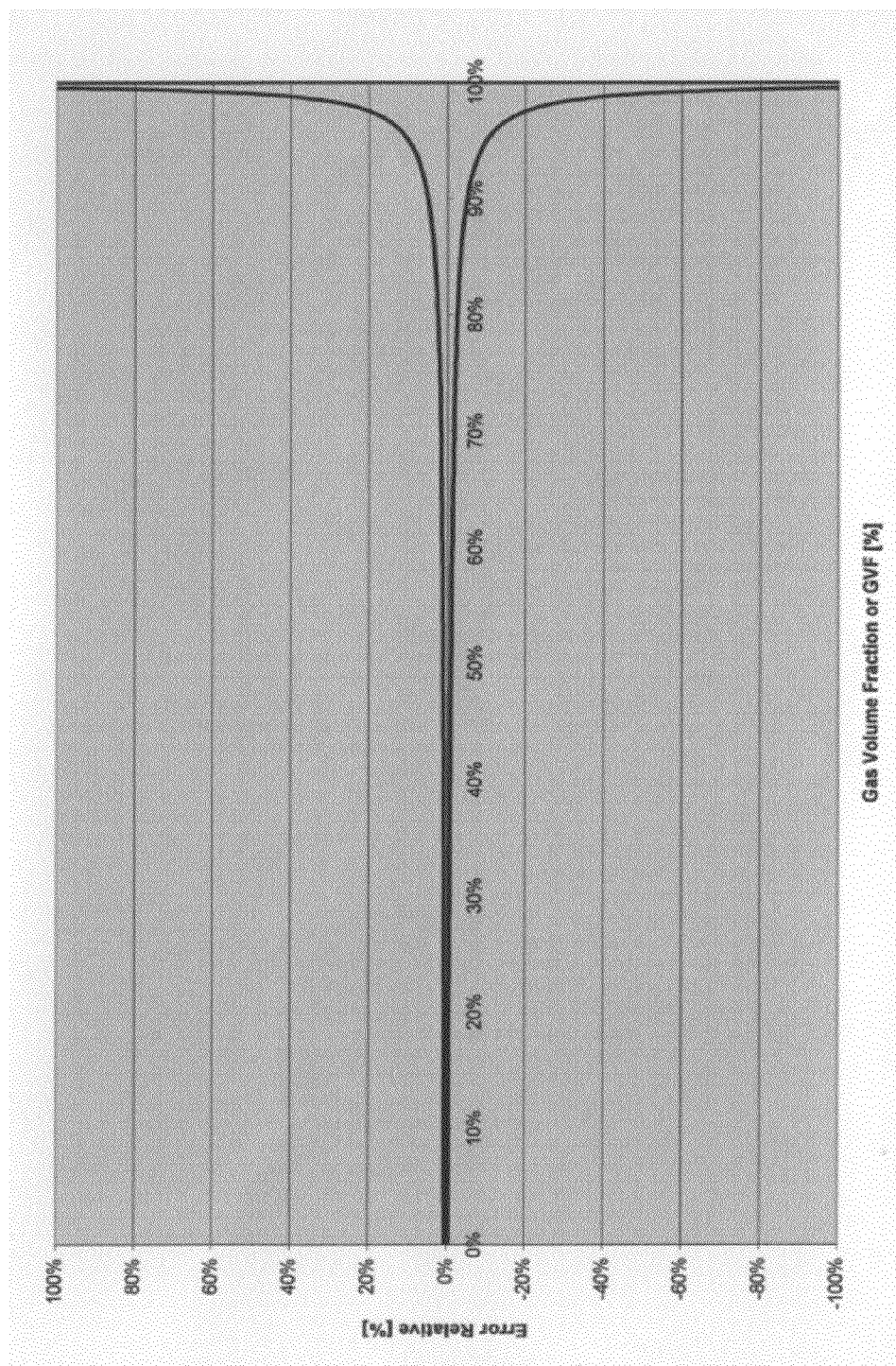
FIG. 1 represents a typical relative error rate for flow rate measurements in multiphase conditions.

The trumpet shape of the relative error of the liquid (or oil or water) phase shown in FIG. 1 comes from the mathematical solution or propagation error. The error is substantially independent of the technology used (i.e., technique of measurement). A multiphase flow meter gives a primary output, which is the total volumetric flow rate or mass flow rate. This is less cumbersome to do than to try to measure each phase distinctively and at the same time. Then a fraction measurement technique (irrespective of the technology, i.e. technique of measurement) does (i.e. provides) a first distinction of one phase among the others. Most of multiphase flow meters look for the distinction of gas liquid ratio (i.e., GOR1 for gas to oil ratio or GWR1 for gas to water ratio or GLR for gas to liquid ratio) due to the large contrast in terms of properties between these two phases. This leads by definition to the measurement or the calculation of the Gas Volume Fraction (GVF). Again, it is important to mention that this is irrespective of the technique of measurement. For example, there are some meters claiming to measure either the total volumetric flow rate then a gas flow rate, or directly measuring the GVF or again some doing a model of the GVF versus other parameters. In any case, this leads to the same result, an evaluation of this GVF parameter defined as follows:

$$GVF = \frac{Qgas_{LC}}{Qtot_{LC}} \qquad \text{Equation (1)}$$

In Equation (1), $Qgas_{LC}$ is the flow rate of gas (quantity expressed in mass or volume of gas per unit of time), and $Qtot_{LC}$ is the flow rate of the whole flow (quantity expressed in mass or volume of the whole multiphase flow per unit of time). Further, a distinction between the oil and water phases is made that leads to a straight measurement of the flow rate. The water liquid ratio (WLR) can be calculated. The opposite parameter, Oil Liquid Ratio (OLR), can be also calculated. The sum of both parameters is equal to 1.

$$WLR = \frac{Qwater_{LC}}{Qliq_{LC}} \qquad \text{Equation (2)}$$

In Equation (2), $Qwater_{LC}$ is the flow rate of water (quantity of water in the multiphase flow expressed in mass or volume of water per unit of time), $Qliq_{LC}$ is the flow rate of the whole liquid phase of the flow (quantity of the liquid phase in the multiphase flow expressed in mass or volume of liquid by unit of time), each at line conditions and $$OLR = \frac{Qoil_{LC}}{Qliq_{LC}} \qquad \text{Equation (3)}$$

In Equation (3), OLR is the oil to liquid ratio, $Qoil_{LC}$ is the flow rate of oil of the flow (quantity of oil in the multiphase flow expressed in mass or volume of oil by unit of time), and $$OLR + WLR = 1 \qquad \text{Equation (4)}$$

It is therefore possible to calculate the error of the water flow rate, for example. (This could be done for the others variables such as oil in the same way):

$$Qwater_{LC} = WLR \cdot Qliq_{LC} = WLR \cdot (Qtot_{LC} - Qgas_{LC}) \qquad \text{Equation (5)}$$

Equation (5) is equivalent to:

$$Qwater_{LC} = WLR \cdot Qtot_{LC} \cdot (1 - GVF) \qquad \text{Equation (6)}$$

The relative error is then calculated using here the method of the root means square but any other known way would lead to errors of similar magnitude:

$$\frac{\Delta Qwater_{LC}}{Qwater_{LC}} = \sqrt{\left(\frac{\Delta WLR}{WLR}\right)^2 + \left(\frac{\Delta Qtot_{LC}}{Qtot_{LC}}\right)^2 + \left(\frac{\Delta GVF}{1-GVF}\right)^2} \quad \text{Equation (7)}$$

For the oil, the relative error rate is, using again for instance the method of the root means square:

$$\frac{\Delta Qoil_{LC}}{Qoil_{LC}} = \sqrt{\left(\frac{\Delta WLR}{1-WLR}\right)^2 + \left(\frac{\Delta Qtot_{LC}}{Qtot_{LC}}\right)^2 + \left(\frac{\Delta GVF}{1-GVF}\right)^2} \quad \text{Equation (8)}$$

In Equations (7) and (8), $\Delta WLR$ is the absolute error on WLR, $\Delta Qtot_{LC}$ is the absolute error on $Qtot_{LC}$, and $\Delta GVF$ is the absolute error on GVF.

We have calculated the relative error on $Qwater_{LC}$ or $Qoil_{LC}$, as expressed by equations 7 and 8 respectively, and shown that it depends on 3 parameters which are water liquid ratio (WLR), total volumetric flow rate or total mass flow rate Qtot (both relative errors, mass or volume, being equal), and Gas Volume Fraction (GVF). Usually the accuracy of WLR and GVF is given in absolute error. The errors on the total volumetric or total mass flow rates are given most of the time in relative error.

It is quite common to get, in a certain range, a relative error, which is constant for the volumetric or mass flow rate Qtot except at low volumetric or mass flow rate. It is then possible to reduce equation (8), for graphic representation, to only two parameters as presented on FIGS. 2 and 3.

Figure 2:
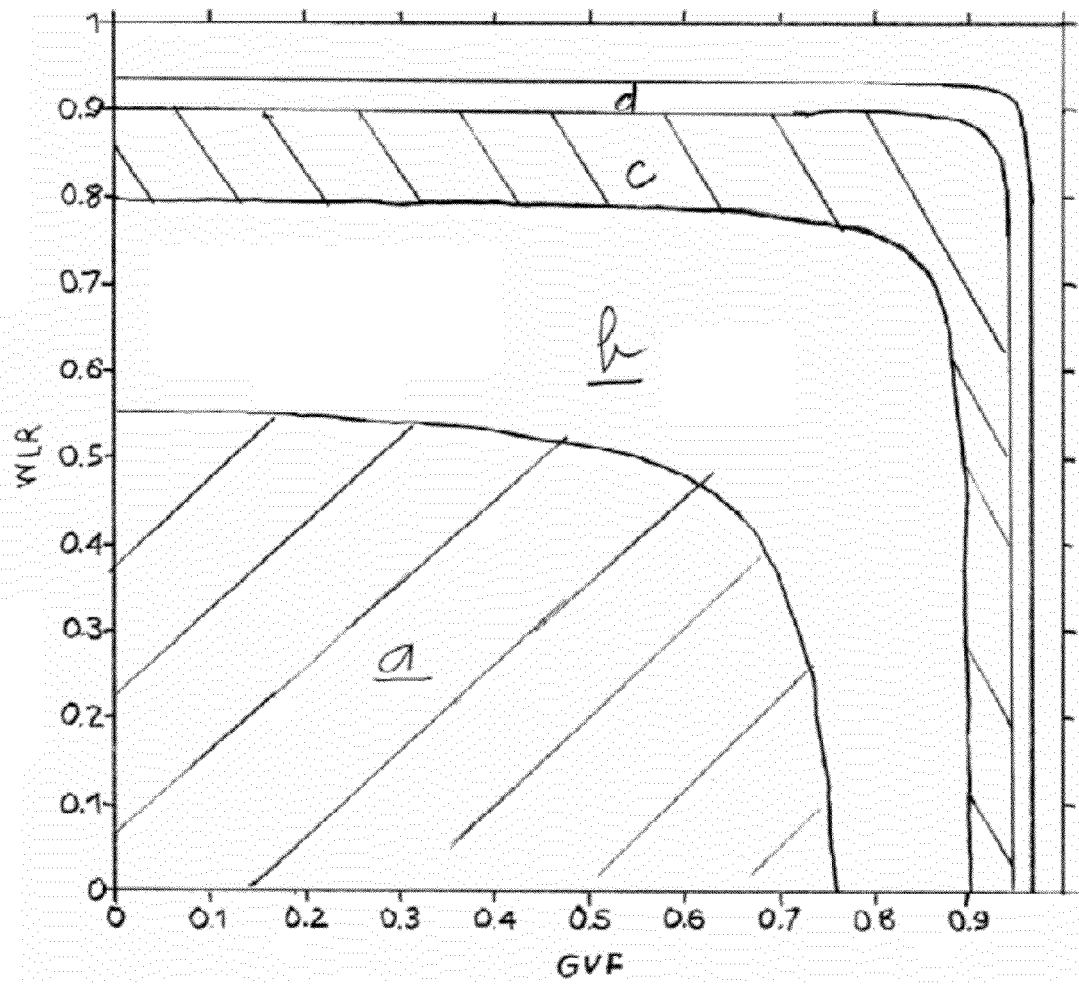
FIGS. 2 and 3 represent, each in a two dimensional plan, the dimensions being the gas volume fraction (GVF) and the water to liquid ratio (WLR), zones where the relative error of the oil flow rate is between two values, for flow meters according to the prior art.
Figure 3:
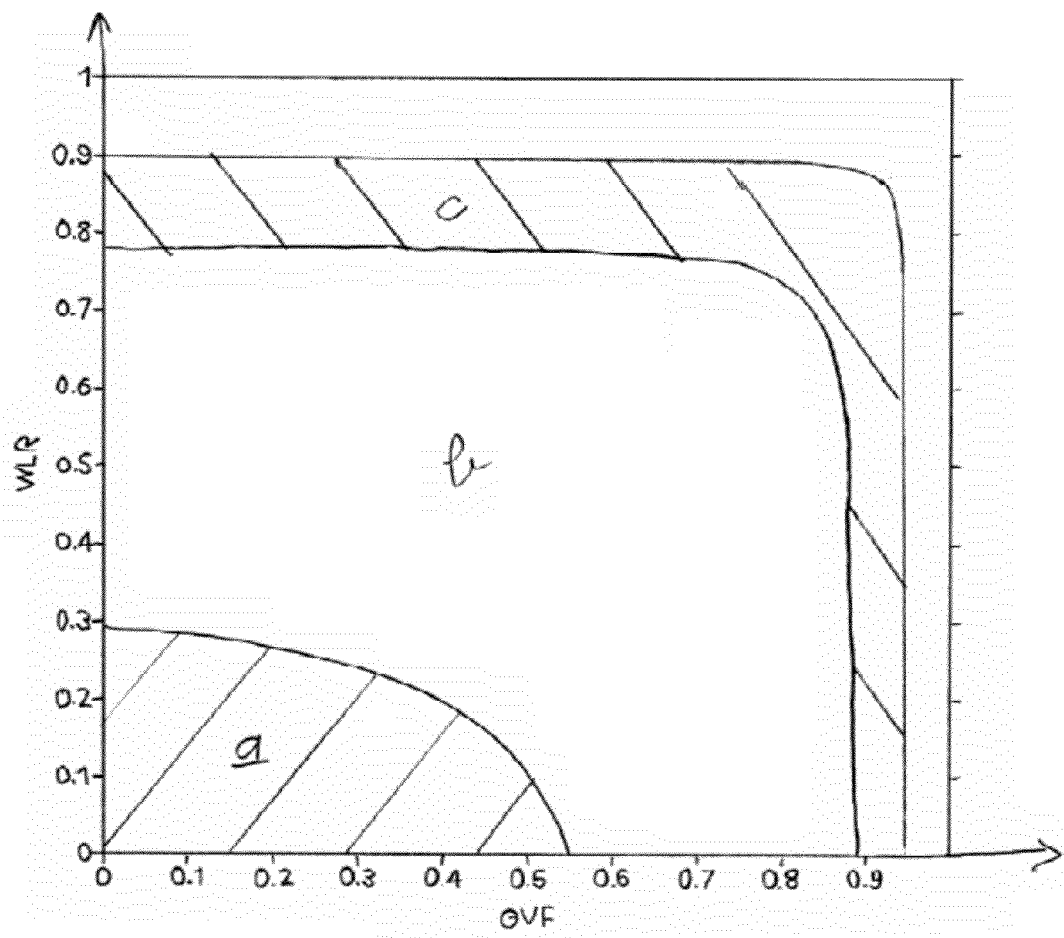

FIGS. 2 and 3 are graphics devoted to represent values of the errors in a two dimensional plan. The two dimensions are GVF, the values of which are on the axis of abscissa and WLR on the ordinate axis. An absolute error is assumed of 0.02 for WLR and of 0.01 for GVF. The relative errors on total volumetric flow rate Qtot have been assumed at 2 and 4% on the graphics of FIGS. 2 and 3 respectively.

In a first slope-hatched zone of the two graphs marked (a), the relative error on the oil flow rate is less than 0.05. In the graphic of FIG. 2, the slope-hatched zone (a) encompasses maximum values of WLR up to 0.55 (with GVF=0) and of GVF up to 0.75, (with WLR=0). The maximum values are limited to 0.3 and 0.55 respectively in FIG. 3.

In a second zone marked (b) in both FIGS. 2 and 3 and represented in white with no hatching, the relative error on the oil flow rate is between 0.05 and 0.1. In the graphic of FIG. 2, the zone (b) encompasses maximum values of WLR up to 0.8 (with GVF=0) and of GVF up to 0.9, (with WLR=0). The maximum values are limited to 0.78 and 0.88 respectively in FIG. 3.

In a third slope-hatched zone marked (c) in both FIGS. 2 and 3, the relative error on the oil flow rate is between 0.1 and 0.2. In the graphic of FIG. 2, the zone (c) encompasses maximum values of WLR up to 0.9 (with GVF=0) and of GVF up to 0.95, (with WLR=0). The maximum values are 0.9 and 0.95 respectively in FIG. 3.

In a fourth zone marked (d) in FIG. 2 and represented in white with no hatching, the relative error on the oil flow rate is between 0.2 and 0.3. In the graphic of FIG. 3, the zone (d) encompasses maximum values of WLR up to 0.95 (with GVF=0) and of GVF up to 0.98, (with WLR=0).

It is apparent from the graphics of FIGS. 2 and 3 that at high WLR or at High GVF the performance of any multiphase flow meter on the market is limited (absolute error above 20% when WLR>90% and GVF>95%) and this is a fundamental problem. The values used above are intended to illustrate the issues and do not presuppose the performance of some multiphase flow meters against others. The trend is the same in any case.

From an economical point of view, this limitation of the accuracy measurement of oil flow rate at high GVF and WLR is equivalent in the oil industry to brownfield or ageing field where wells are producing less and less oil and therefore more water (due to the reservoir conditions or from the water injection). Moreover, as the reservoir is becoming depleted, this causes the pressure to become low and therefore more and more gas is coming to surface or gas lift is used and then the gas holdup at surface conditions is very high. The case of high WLR or GVF represents most of 70% of the current production worldwide and this percentage is only increasing with time due to less and less discovery and more and more focus on the second or third enhancement recovery techniques to produce more from the same reservoirs.

It is shown that the present state of the art cannot deal with measurement of flow rate having an improved accuracy when GVF and/or WLR are high. Thus, there is a need for such an improved multiphase flow meter.

Our invention improves accuracy of the oil and water flow rate measurement for an increased range of GVF and WLR with a specific answer for high GVF and High WLR. According to the invention, an additional measurement can be obtained, such as WLR, or a use of a fluid properties information, such as the gas oil ratio (i.e., GOR1) or gas water ratio GWR1. The invention makes it possible to claim a relative error much lower than the past performance of any multiphase flow meter for most of the range of GVF and WLR.

According to the invention, to properly address this fundamental issue and to keep a compact multiphase solution, one of the key parameters expressed above is measured at line conditions (LC). The GVF is usually a very challenging measurement and possibility to control this measurement is very difficult, except on some specific installation, such as flow loop. The easiest measurement to obtain and the focus of the largest research and development is the WLR measurement. However, as previously discussed, if inside a pipe there is a predominant presence of one phase, such as gas, most of the time it is difficult to obtain an accurate WLR measurement. This can be understood from a physical point of view. First if it is assumed that there is 97% gas holdup in a section, this means that there is only 3% of liquid present in the pipe. Then for example to measure a WLR of 50% it is obvious that a high resolution and accuracy of WLR measurement is required; i.e., a WLR of 50% for 3% of liquid means that there is only 1.5% of oil and 1.5% of water flowing inside the pipe. It is also to be noted that the velocity of these phases is usually in the range of 1 m/s up to 100 m/s. Achieving 2% accuracy on the relative error of WLR leads to a resolution better than 1.5%× 2%, which is around 3/10000. This becomes a very challenging hold up measurement and requires about 1/1000 in terms of accuracy to achieve a fair measurement. The WLR can be defined as described hereafter:

$$WLR = \frac{Qwater_{LC}}{Qliq_{LC}} = \frac{Qwater_{LC}}{(1-GVF)\cdot Qtot_{LC}} \quad \text{Equation (9)}$$

$$\left(\frac{\Delta WLR}{WLR}\right) = \sqrt{\left(\frac{\Delta Qwat_{LC}}{Qwat_{LC}}\right)^2 + \left(\frac{\Delta Qtot_{LC}}{Qtot_{LC}}\right)^2 + \left(\frac{\Delta GVF}{1-GVF}\right)^2} \quad \text{Equation (10)}$$

The other way to obtain the WLR usually is by measuring the fraction of water, Frwater, versus the fraction of liquid, Frliq, in the multiphase flow. Frliq is equal to 1−Frgas, Frgas being the fraction of gas in the multiphase flow. Assuming that the speed slippage between both liquid phases is not important versus the flow rate, i.e., that the velocity of both phases is identical, it leads to a second expression to calculate the WLR. For information, the assumption above about the liquid phase velocity has been confirmed.

$$WLR = \frac{Frwater_{LC}}{Frliq_{LC}} = \frac{Frwater_{LC}}{1 - Frgas_{LC}} \quad \text{Equation (11)}$$

In Equation (11), Fr represents the fraction or hold up of the mentioned phase at line conditions indicated by $_{LC}$.

It should be noted that the expressions (equations) 9 and 11 are fundamentally different in the sense that for the first case we refer to a flow rate ratio, while in the second case this is related to the snapshot done of a measurement in a section of the pipe. Meanwhile, it had been demonstrated that both equations are equivalent in the range of velocity at surface.

It is therefore possible to calculate the relative error of the WLR which can be expressed by:

$$\left(\frac{\Delta WLR}{WLR}\right) = \sqrt{\left(\frac{\Delta Frwat_{LC}}{Frwat_{LC}}\right)^2 + \left(\frac{\Delta Frgas}{1-Frgas}\right)^2} \quad \text{Equation (12)}$$

For the oil liquid ratio OLR the expression is then:

$$\left(\frac{\Delta OLR}{OLR}\right) = \sqrt{\left(\frac{\Delta Froil_{LC}}{Froil_{LC}}\right)^2 + \left(\frac{\Delta Frgas}{1-Frgas}\right)^2} \quad \text{Equation (13)}$$

Again both formulations above show that, in the presence of a large amount of gas, the accuracy of the WLR or OLR is diverging versus gas holdup due to the expression 1/(1−Frgas). Moreover in the case of a small presence of oil or water, respectively, the OLR or WLR will not accurately be obtained due in this case to the first member of the expressions 12 and 13.

Getting a good accuracy in the measurement of the water liquid ratio, WLR, or the oil liquid ratio, OLR, even in conditions of low concentration of oil or water and high GVF, is solved according to the invention in two different ways: a first way requires an additional detector for distinguishing phases in a multiphase fluid mixture. A second way is based on the introduction of an invariant of the multiphase flow and requires information about the fluid properties that can be obtained very easily from any wells such as GOR1 or GWR1.

The invention addresses the problem of accuracy of the oil quantity in a manner different from most of the systems on the market by an improved multiphase flow metering system that is compact and requests minimum information if none from a user. The invention is not focused on the main phase, which is interfering in the measurement, the main phase being the gas.

The trend in the industry has been trying to remove a large amount of gas to reduce the GVF. In contrast, according to the invention, a small amount of liquid which is the interesting phase is sampled and a proper measurement of the WLR or OLR is made out of this sample. The challenge becomes to find first the most appropriate place whatever the GVF and WLR conditions and irrespective of the total flow rate to collect the sample of a liquid. A fundamental aspect of our invention is to get an enriched liquid sample taken from the multiphase flow. The sampling does not presuppose to have a full separation with the gas, which will then bring back the same issue about the quality of the gas-liquid separation. A second aspect of this invention is to have a detector or sensor tolerant in one way or another to the gas captured within the enriched sample. Such a detector allows for a measurement of the quantities of oil and water in the enriched sample by counting only those liquid phases and not the quantity of gas. The main advantage of the invention is to take only a sample of liquid with possibly some gas from the main pipe without interfering with the main flow, to avoid differential pressure loss.

Thus, the invention provides a method for determining the values of flow rates of each of the components of a liquid holdup of a multiphase flow circulating in a main pipe of an oil well, the pipe having a central line, the multiphase flow including gaseous phase and liquid phases, the liquid phases including water and oil, the method including measuring a total quantity of the flow (Qtot), a total quantity of the gas (Qgas) and a total quantity of the liquid phase (Qliq) of the flow using a multiphase flow meter. The method includes: disposing an inlet of a sampling core sampler inside the main pipe, the inlet having a central axis, at a place where a concentration of the liquid phase in the flow is greater than an average concentration of the liquid phase in the main pipe, to get a derived sample, the derived sample having a greater concentration of oil and water than an average concentration in the main pipe; measuring a quantity of water (Qwater) and a quantity of oil (Qoil) of the derived sample; and calculating from the measured quantity of water (Qwater) and quantity of oil (Qoil) of the derived sample and from the total quantity of the liquid phase (Qliq), measured by the multiphase flow meter, calculated quantities of water and oil in the multiphase flow.

In this application, quantity of gas or liquid refers to a quantity per whatever the unit of time is. Thus, the quantity is equivalent to a flow rate of the liquid or the gas.

In one embodiment, the inlet of the core sampler is disposed in an outer part of a curved part of the main pipe, the central line of the inlet being in the outer part of the main pipe. The outer part of the main pipe is a volume of the main pipe wherein a radius of curvature of a line parallel to the central line of the main pipe is greater than the radius of curvature of the central line.

We have shown that in a curved part of the main pipe, due to centrifugal forces, the densest part of the flow, which is in the present case the liquid part, is driven toward the outer part of the curved part. Then, from the part where the radius of curvature is minimum along an inner wall of the curved part of the main pipe up to the part where the radius of curvature is maximum along an outer wall of the curved part, the relative part of the liquid content is increasing. Although any place in the curved part will have a greater concentration of liquid, it is better to place the core sampler in the outer part as defined above. In spite of the slight difference of density between water and oil, it can be shown that the enriched derived sample has the same proportion of oil and water, relative to the total quantity of liquid as the liquid part of the flow.

In another embodiment, the inlet of the core sampler is disposed immediately at the output of the curved part, the central line of the inlet of the core sampler being in a part of the main pipe containing a line parallel to the central line of the main pipe, the parallel line having a portion thereof in the outer part of the curved part of the main pipe.

The expression "immediately at the output" of the curved part means that the inlet is sufficiently near the output of the curved part for the liquid part being still concentrated in a part of the main pipe including a line parallel to the central line of the main pipe, the parallel line having a portion thereof in the outer part of the curved part of the main pipe. Such a place is of course at the part where the pipe ceases to have a curvature. Alternatively, the inlet of the core sampler may be in the area of the curved part.

In an embodiment, the method for measuring the quantity of water (Qwater) and the quantity of oil (Qoil) of the derived sample includes discriminating oil, water and gas by means of an optical discriminator of oil, water and gas, inserted in the derived sample and getting signals from the discriminator indicating whether a tip of the discriminator is perceiving oil, water or gas; and processing signals issued by the optical discriminator for outputting the values of the quantities of oil and water from the liquid phase of the derived sample.

An optical discriminator is known in the art and could be a discriminator with an optical fiber, such as the one described in German patent application DE 0333 939 published in 1989, incorporated herein by reference.

In one embodiment of the invention the optical discrimination of oil, water and gas is made by discriminating the refractive indexes with an Optical Probe Detector or discriminator, adapted to discriminate between refractive indexes of oil, water and gas. The discriminator and ways to use it, in particular in use for oil wells, is known in the art, an example being described in U.S. Pat. No. 5,956,132, incorporated herein by reference. As the discriminator is known in the art, further details thereof are not described as persons skilled in the art are familiar with such details. The discriminator described in the above cited U.S. patent is referred to as an Optical Probe Discriminator (OPD).

In an embodiment of the invention, the OPD is inserted in a liner in a sealed connection with the core sampler, the liner having, at least at the place where a tip of the OPD is inserted, an inner diameter small enough for allowing the water and oil to circulate in plugs in the liner by capillarity effect.

In another embodiment of the invention the OPD is inserted in a cell of Paul Guieze, the cell having an inlet of the cell in a sealed connection with the core sampler through a liner, a tip of the discriminator being inserted in an internal flowing line of the cell having, at least at the place where a tip of the OPD is inserted, a diameter small enough for allowing the water and oil to circulate in plugs in the flowing line by capillarity effect.

The cell described above as a cell of Paul Guieze with an OPD inserted in several ways in it, is described in European Patent Application EP 1 617 202 published in January 2006, incorporated herein by reference. The cell described in the European patent is referred to as a Paul Guieze cell, based on the name of the inventor of the cell. As the cell including the OPD is known in the art, further details thereof need not be described since persons skilled in the art are aware of such details.

According to a variant of the invention, if a property of the fluid is known, for instance GOR1 or WLR1 associated with the flow rates, then it becomes possible to choose between two ways of computing for instance the quantity of oil Qoil. For this part of the invention no additional measurement than the one by the usual multiphase flowmeter is needed.

Usually, the fluid properties of the flow are known at one moment or another in the life of the well, this could be at the beginning of the well life or at a later stage. This knowledge is usually required to determine the fluid behavior versus time, pressure and temperature and to be able to define gas, and oil coming from the reservoir. One of the key measurements done or usually monitored is the gas to oil ratio called here (GOR1) which is then an a priori known value. This parameter represents the amount of free gas (the one not dissolved inside the oil at line conditions) versus the oil at line conditions and is defined as:

$$GOR1 = \frac{Qgas_{LC}}{Qoil_{LC}} \qquad \text{Equation (14)}$$

The expression is still valid if the fluid is coming out from the reservoir. In addition, this value is usually constant if the well is producing in a monophasic manner downhole and the pressure and temperature condition is kept constant at the multiphase flow meter. The parameter GOR1 is used to verify usually if the well is producing monophasic downhole. The parameter GOR1 is a constant versus pressure, temperature and choke opening.

Another concept introduced in the multiphase metering is the invariant which can be expressed as a combination of the GOR1,WLR and LVF (liquid Volume Fraction, i.e., 1−GVF) which is always equal to 1 whatever temperature, pressure and flow conditions. This is expressed below based on the definition of each parameter. This invariant as expressed in the equation (15) is an important parameter in this second part of the invention:

$$1 = \frac{Qgas_{LC}}{Qoil_{LC}} \frac{Qoil_{LC}}{Qliq_{LC}} \frac{Qliq_{LC}}{Qgas_{LC}} = GOR1 \cdot OLR \cdot \frac{1}{GLR} \qquad \text{Equation (15)}$$

In Equation (15):

$$\frac{1-GVF}{GVF} = \frac{1}{GLR} \qquad \text{Equation (16)}$$

with GLR being the gas to liquid ratio.

This fundamental invariant can be reused to improve drastically the overall accuracy of the measurement of the water and oil flow rate, for example. As mentioned previously, one of the most challenging measurements is the WLR or OLR in high GVF or at high WLR or OLR (following the multiphase technology used) therefore it is possible, based on the above equation, to express it as:

$$1 - WLR = \frac{GLR}{GOR1} \qquad \text{Equation (17)}$$

and $$WLR = 1 - \frac{GVF}{(1-GVF) \cdot GOR1} \qquad \text{Equation (18)}$$

An aspect of this invention is to rewrite the water and oil flow rate with this new definition:

$$Qwater_{LC} = \quad \text{Equation (19)}$$
$$WLR \cdot (1 - GVF) \cdot Qtot_{LC} = \left(1 - GVF - \frac{GVF}{GOR1}\right) \cdot Qtot_{LC}$$

and $$Qoil_{LC} = (1 - WLR) \cdot Qtot_{LC} \cdot (1 - GVF) = Qtot_{LC} \frac{GVF}{GOR1} \quad \text{Equation (20)}$$

This rewriting and the new invariant parameter introduced previously are first dedicated to Oil or WLR. As shown by the equation 21 below giving the value of the relative error for instance for Qoil, the value of the relative error has only a GVF dependency and not anymore a (1−GVF) dependency. This means that it is possible to get a better accuracy at high GVF or low (1−GVF) which is specifically where all multiphase flow meters have a large difficulty to evaluate the oil and water flow rates. The calculation of the error relative to oil flow rate is then now:

$$\frac{\Delta Qoil_{LC}}{Qoil_{LC}} = \sqrt{\left(\frac{\Delta GOR1}{GOR1}\right)^2 + \left(\frac{\Delta Qtot_{LC}}{Qtot_{LC}}\right)^2 + \left(\frac{\Delta GVF}{GVF}\right)^2} \quad \text{Equation (21)}$$

The same type of expression can be obtained for the water based on the equation 21. There are then two types of expression to calculate the oil flow rate and water flow rate, which enable one to obtain a better accuracy of measurement in the range of GVF, assuming only one fluid parameter is given, GOR1.

As explained above, at low GVF the accuracy of the multiphase flow meter measuring oil, water, gas flow rate is quite good. However, at high GVF due to the large presence of gas the accuracy is worse. In this case using the information about the GOR1 it is possible to obtain a much better accuracy.

Then, according to the invention, a value of a relative error on the quantity is calculated first when using the first member of equation 20 and when using the second member of equation 20, wherein the first and second members are on the two sides of the = sign in the equation, comparing the two relative errors and choosing the first or second member to get the quantity of oil. It is then possible to select which method should be the best to deliver the flow rate versus traditional way or innovative way as explained herein.

Several simulations have been done, described below, which demonstrate that in a certain range of GVF depending on the accuracy of the GOR1, the relative error and the associated flow rate value of the flow rate are more accurate when this invention is used.

Figure 4:
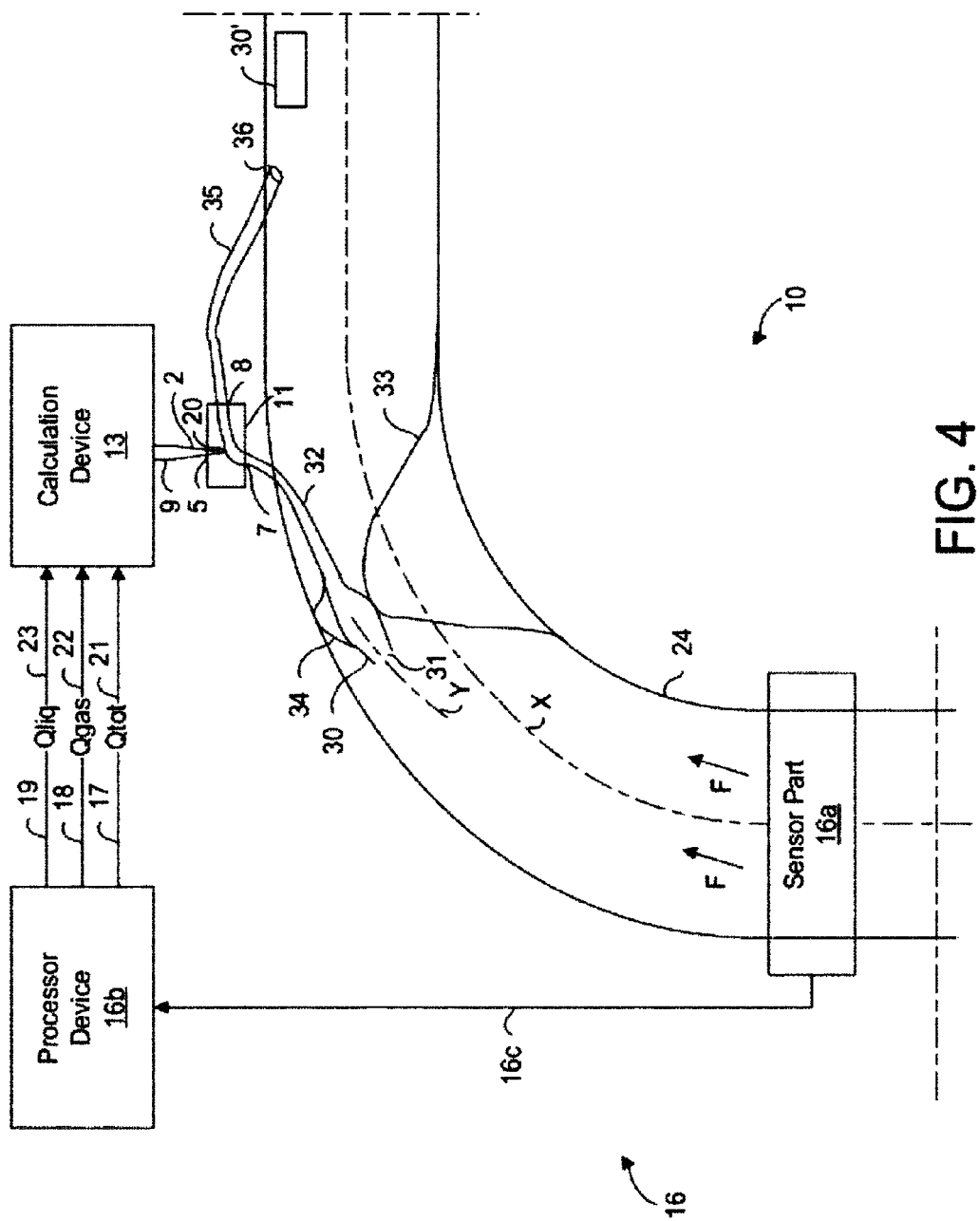
FIG. 4 is a schematic representation of one embodiment of the invention.

An embodiment of the invention is described in relation to FIG. 4, which represents an equipped section 10 of a main pipe of an oil well. The term section is used to stipulate that only a part 24 of the main pipe is shown as an exemplary placement of the exemplary embodiment of the invention. The equipped section 10 includes the part 24 of the main pipe including all the other equipment parts (which may be referred to as devices or apparatus of the invention), which are in the main pipe. It also includes all the other parts of the equipment, included in the invention. The equipments, which are in the part 24 of the main pipe, include at least a sensor part 16a of a multiphase flow meter 16. The sensor part 16a is used for sensing flow rates of a multiphase flow including gaseous phase and liquid phases, the liquid phases including in particular water and oil. The multiphase flow is the flow circulating in the section 24 of the main pipe in a direction shown by arrows F. The multiphase flow meter 16 also includes processing means 16b coupled to the sensor part 16a for processing data coming from the sensor part 16a. The processing means 16b are also known in the field as Data Acquisition Flow Computer (DAFT). Alternatively, such processing means can be any suitable processor-based or signal processor-based devices. In FIG. 4, the coupling between the sensor part 16a and the processing means 16b has been represented by a connecting line 16c. The processing means 16b have outputs 17, 18, 19 to deliver respectively signals representing the values of the total flow of fluid Qtot, the total flow of the gaseous phase Qgas and the total flow of the liquid phase Qliq circulating in the section 10 of the main pipe. The outputs 17-19 of the processing means are connected to transmission means 21, 22, 23 (also referred to as links) for transmitting the signals representing values of rate of flow. In FIG. 4 the transmission means and the connecting line 16c are shown as transmission lines, such as conductive threads or coaxial lines. Any other transmission means could be used in place of the transmission lines 16c and 21-23, such as optical links, radio waves and similar items. The links may be serial links or parallel links. Since multiphase flow meters are known in the art, persons of ordinary skill are familiar with their construction and use, and thus they are not discussed in detail for the sake of brevity. In FIG. 4, a central line X of the section 24 is shown. The central line is a line passing through the centers of every cross section of the section 24.

According to the invention, the equipped section further includes a core sampler 30, and means for measuring a quantity of water (Qwater) and a quantity of oil (Qoil) of the derived sample captured by the core sampler 30. The means include a sensing tip 20 positioned for sensing the derived sample and issuing a signal varying in accordance with what data is sensed. The equipped section also includes a calculating means 13 coupled with the sensing tip 20 for deriving from the sensed signal of the sensing tip 20 the quantity of water (Qwater) and the quantity of oil (Qoil) of the derived sample. The calculating means 13 is further coupled to outputs 17-19 of the processing means 16b of the multiphase flow meter 16, and derives a signal representative of the total quantity of liquid in the multiphase flow, the calculating means 13 deriving from further received values the quantity of oil and water in the multiphase flow, as described below. The calculating means can be any suitable processor-based or signal processor-based devices.

The core sampler 30 has an inlet 31 inside an outer part of the section 24 for capturing a part of the multiphase flow circulating inside the section 24. The outer part is a place where a concentration of the liquid phase in the flow is greater than an average concentration of the liquid phase in the main pipe. The core sampler 30 may be placed in any part where a concentration of the liquid phase in the flow is greater than an average concentration of the liquid phase in the main pipe. In particular and as represented schematically in 30', the core sampler may be placed immediately after the curved portion of the main pipe. Due to its position, the core sampler captures a derived sample that includes more of the liquid phase than the average of the multiphase flow. The inlet 31 is an aperture of the core sampler 30. A central axis Y of the inlet 31 is an axis of the aperture. A liner 32 is in a sealed connection with the core sampler 30 so as to carry the flow collected by the core sampler 30. The core sampler 30 is maintained where desired in the section 24 by means 33, 34 for maintaining the core sampler 30. In the example of FIG. 4 the means 33, 34 are elastic blades, holding mechanisms, and the like, mechanically linked to the core sampler 30 and resting on the wall of the section 24.

In an embodiment shown in FIG. 4, the liner 32 is connected to a Paul Guieze cell 11, which is outside the section 24. As known in the art, the Paul Guieze cell 11 includes an input connection 7. The input connection 7 is in sealed connection with the liner 32 to introduce the derived sample captured by the core sampler 30 into the cell 11. The cell 11 has a bore 5 for receiving an OPD 2.

The calculating means 13 is coupled with the sensing tip 20 of the OPD 2, through an optical fiber 9. The calculating means 13 is further coupled to the outputs 17-19 of the processing means of the multiphase flow meter 16 and delivers the signal representative of the total quantity of liquid in the multiphase flow. The calculating means 13 then derives from the received values the quantity of oil and water in the multiphase flow.

In the embodiment represented in FIG. 4, an output 8 of the Paul Guieze cell 11 is in sealed connection with a liner 35 having an output 36. The output 36 is inside the section 24 of the main pipe. As represented on FIG. 4, the output 36 of the liner 35 is located downstream of the inlet 31. Thus, the pressure at the output 36 is less than the pressure at the inlet 31. This is a condition for the flow to circulate through liner 32, cell 11 and liner 35. It is to be noted that the position downstream of the output 36 of the flow relative to the inlet 31 is not mandatory. The output 36 can be placed at any suitable place where the pressure of the flow is less than the pressure at the inlet 31, for example, upstream of the inlet 31 behind a valve.

Figure 5:
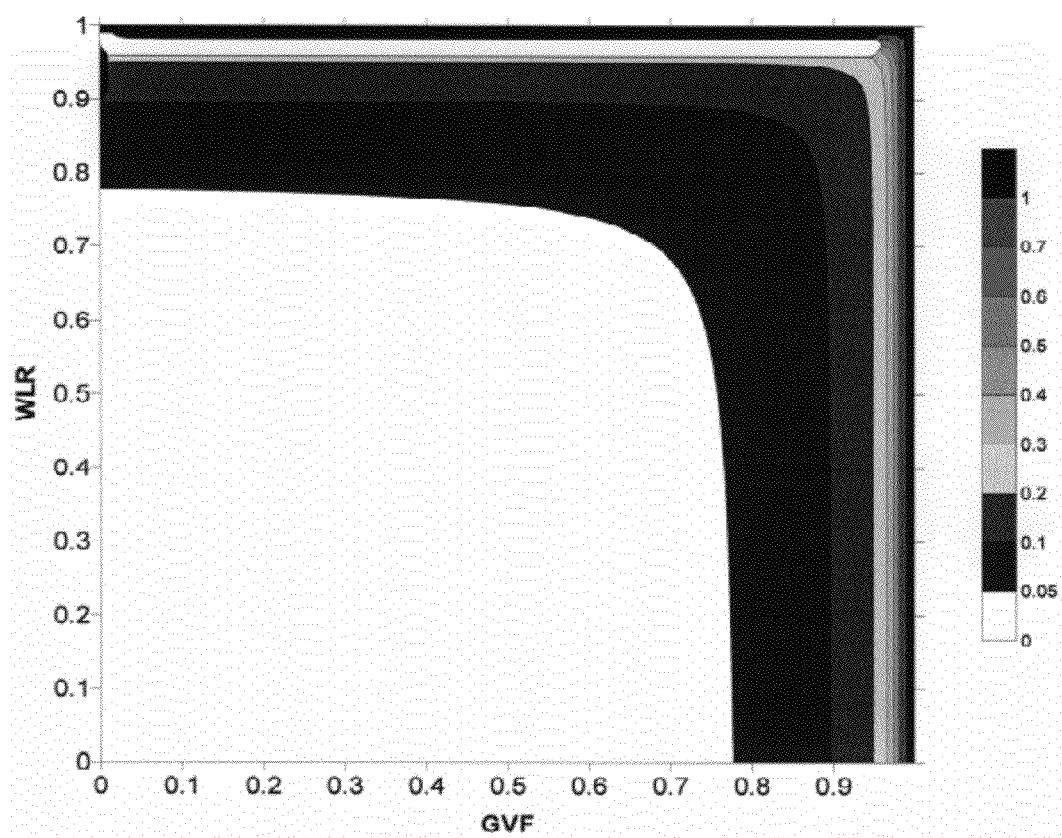
FIGS. 5 and 6 represent in a two dimensional plan, the dimensions being a gas volume fraction and a water to liquid ratio, zones where the relative error of the oil flow rate is between two values, for multiphase flow meters of preferred embodiments of the invention.

FIG. 5 is a graphic showing the values of the errors in a two dimensional plan, as for FIGS. 2 and 3. In this case, it has been assumed an absolute error of 0.01 for WLR and of 0.01 for GVF. The relative errors on total volumetric flow rate Qtot have been assumed at 2%. A large improvement has been noted in comparison with FIG. 2, with a relative error less than 10% in the range from 0 to 90% for GVF and WLR.

Figure 6:
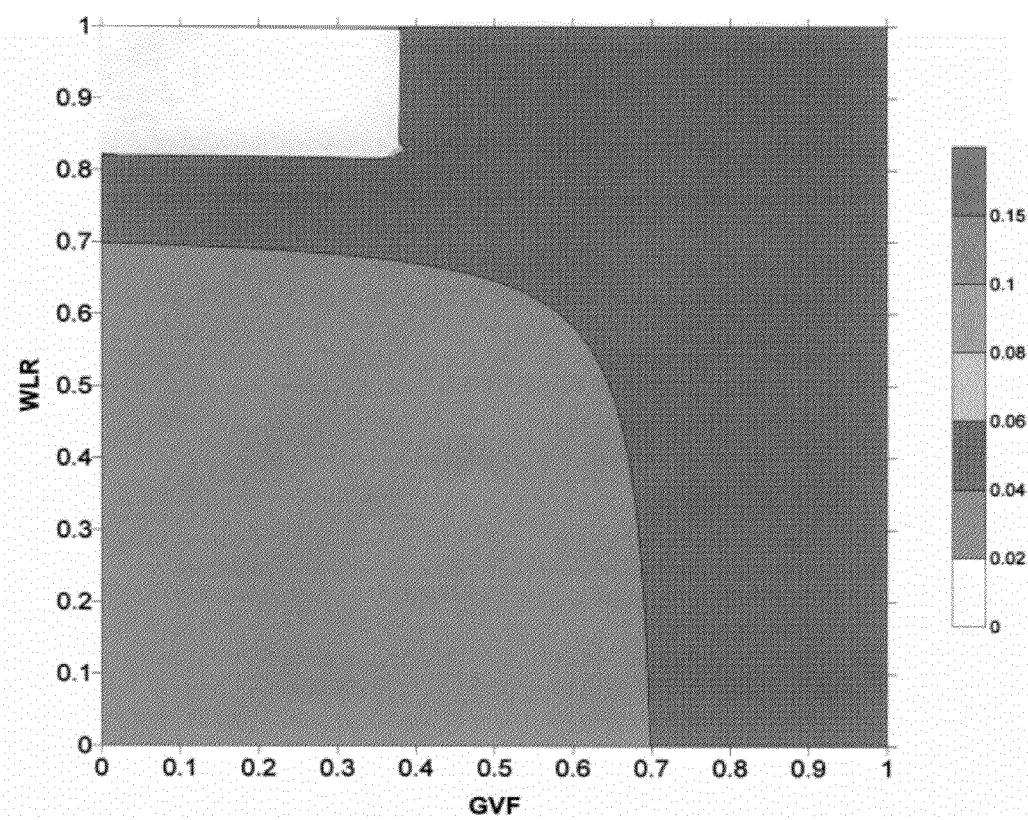

Using the same inputs data as previously represented and adding the fact that the GOR1 is known at 5%, a large improvement is demonstrated, as illustrated in FIG. 6, in comparison with the traditional measurements. In this figure, the color level is changed from the previous graph to show a better idea of the impact in terms of accuracy. The accuracy is shown to be better than 10% for any GVF and WLR except in low GVF (<10%) and WLR higher than 90%. This is a great improvement as stated previously due to the large population of wells at high GVF (more than half of the wells worldwide).

The above-described devices and subsystems of the exemplary embodiments of FIGS. 1-5 can include, for example, any suitable servers, workstations, personal computers (PCs), laptop computers, personal digital assistants (PDAs), Internet appliances, handheld devices, cellular telephones, wireless devices, other electronic devices, and the like, capable of performing the processes of the exemplary embodiments of FIGS. 1-5. The devices and subsystems of the exemplary embodiments of FIGS. 1-5 can communicate with each other using any suitable protocol and can be implemented using one or more programmed computer systems or devices.

One or more interface mechanisms can be used with the exemplary embodiments of FIGS. 1-5, including, for example, Internet access, telecommunications in any suitable form (e.g., voice, modem, and the like), wireless communications media, and the like. For example, the employed communications networks can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the devices and subsystems of the exemplary embodiments of FIGS. 1-5 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1-5 can be implemented via one or more programmed computer systems or devices.

To implement such variations as well as other variations, a single computer system can be programmed to perform the special purpose functions of one or more of the devices and subsystems of the exemplary embodiments of FIGS. 1-5. On the other hand, two or more programmed computer systems or devices can be substituted for any one of the devices and subsystems of the exemplary embodiments of FIGS. 1-5. Accordingly, principles and advantages of distributed processing, such as redundancy, replication, and the like, also can be implemented, as desired, to increase the robustness and performance the devices and subsystems of the exemplary embodiments of FIGS. 1-5.

The devices and subsystems of the exemplary embodiments of FIGS. 1-5 can store information relating to various processes described herein. This information can be stored in one or more memories, such as a hard disk, optical disk, magneto-optical disk, RAM, and the like, of the devices and subsystems of the exemplary embodiments of FIGS. 1-5. One or more databases of the devices and subsystems of the exemplary embodiments of FIGS. 1-5 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-5 can include appropriate data structures for storing data collected and/or generated by the processes of the devices and subsystems of the exemplary embodiments of FIGS. 1-5 in one or more databases thereof.

All or a portion of the devices and subsystems of the exemplary embodiments of FIGS. 1-5 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1-5 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-5, for driving the devices and subsystems of the exemplary embodiments of FIGS. 1-5, for enabling the devices and subsystems of the exemplary embodiments of FIGS. 1-5 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1-5. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-5 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present inventions have been described in connection with a number of exemplary embodiments, and implementations, the present inventions are not so limited, but rather cover various modifications, and equivalent arrangements, which fall within the purview of the appended claims.

What is claimed is:

1. A method for determining values of flow rates of each of components of a liquid hold up of a multiphase flow circulating in a main pipe of an oil well, the pipe comprising a central line, the multiphase flow including a gaseous phase and liquid phases, the liquid phases including water and oil, the method comprising:
    measuring a total quantity of a flow (Qtot), a total quantity of a gas (Qgas) and a total quantity of a liquid phase (Qliq) of the flow using a multiphase flow meter;
    disposing an inlet of a core sampler inside the main pipe, the inlet comprising a central axis, at a place where a concentration of the liquid phases in the flow is greater than an average concentration of the liquid phase in the main pipe, to obtain a derived sample, the derived sample having a greater concentration of oil and water than an average concentration in the main pipe;
    measuring a quantity of water (Qwater) and a quantity of oil (Qoil) of the derived sample; and
    calculating from the measured quantity of water (Qwater) and the quantity of oil (Qoil) of the derived sample and from the total quantity of the liquid phase (Qliq) measured by the multiphase flow meter, quantities of water and oil in the multiphase flow.

2. The method of claim 1, wherein the inlet of the core sampler is disposed in an outer part of a curved part of the main pipe, the central axis of the inlet being in the outer part of the main pipe, the outer part of the main pipe being a volume of the main pipe, and
    wherein a radius of curvature of a line parallel to the central line of the main pipe is greater than the radius of curvature of the central line.

3. The method of claim 1, wherein the inlet of the core sampler is disposed immediately at the output of the curved part of the main pipe, the central axis of the inlet of the core sampler being in a part of the main pipe including a line parallel to the central line of the main pipe, the parallel line having a part in the outer part of the curved part of the main pipe.

4. The method of claim 1, wherein the measuring the quantity of water (Qwater) and the quantity of oil (Qoil) of the derived sample further comprises:
    discriminating oil, water, and gas by means of an optical discriminator of oil, water and gas, inserted in the derived sample and obtaining signals from the discriminator indicating whether a tip of the discriminator is perceiving oil, water or gas; and
    processing signals issued by the optical discriminator for outputting the values of the quantities of oil and water from the liquid phase of the derived sample.

5. The method of claim 4, wherein the optical discrimination of oil, water and gas is made by discriminating the refractive indexes with an Optical Probe Discriminator (OPD), adapted to discriminate between refractive indexes of oil, water and gas.

6. The method of claim 5, wherein the OPD is inserted in a liner in a sealed connection with the core sampler, the liner having, at least at a place where a tip of the OPD is inserted, an inner diameter small enough for allowing the water and oil to circulate in plugs in the liner by capillarity effect.

7. The method of claim 5, wherein the OPD is inserted in a Paul Guieze cell, the cell having an inlet in a sealed connection with the core sampler through a liner, a tip of the discriminator being inserted in an internal flowing line of the cell having a diameter small enough for allowing the water and oil to circulate in plugs in the flowing line by capillarity effect.

8. The method of claim 6, wherein an outlet of the liner is within the main pipe.

9. The method of claim 7, wherein an outlet of the Paul Guieze cell or an outlet of a liner connected to the outlet of the Paul Guieze cell is within the main pipe.

10. An equipped section of a main pipe of an oil well, the section comprising a central line, the section further comprising:
    a multiphase flow meter, including,
    a sensor part positioned inside the equipped section for sensing flow rates of a multiphase flow including a gaseous phase and liquid phases, the liquid phases including water and oil, the multiphase flow circulating in the section of the main pipe, and
    processing means coupled to the sensor part for processing data coming from the sensor part, having outputs to deliver signal representing the values of the total flow of fluid, the total flow of the gaseous phase and the total flow of the liquid phases circulating in the main pipe, and a transmission means for transmitting the signals representing values of rates of flows;

a core sampler having an inlet inside the main pipe for capturing a part of the multiphase flow, the inlet having a central axis;

a liner in a sealed connection with the core sampler;

means for maintaining the core sampler at a place where a concentration of the liquid phase in the flow is greater than an average concentration of the liquid phase in the main pipe, to obtain a derived sample; and means for measuring a quantity of water (Qwater) and a quantity of oil (Qoil) of the derived sample coming from the liner, and said means for measuring Qwater and Qoil including, a sensing tip positioned for sensing the derived sample and issuing a signal varying in accordance with what is sensed, and calculating means coupled with the sensing tip for deriving from the sensed signal of the sensing tip the quantity of water (Qwater) and the quantity of oil (Qoil) of the derived sample, the calculating means being further coupled to an output of the processing means of the multiphase flow meter delivering the signal representative of the total quantity of liquid in the multiphase flow to derive from the received values the quantity of oil and water in the multiphase flow.

11. The equipped section of claim 10, wherein the means for maintaining the inlet of the core sampler maintains the inlet of the core sampler in an outer part of a curved part of the main pipe, the central axis of the inlet being in the outer part of the main pipe.

12. The equipped section of claim 11, wherein the means for maintaining the inlet of the core sampler maintains the inlet of the core sampler immediately at the output of the curved part, the central axis of the inlet of the core sampler being in a part of the main pipe including a line parallel to the central line of the main pipe, the parallel line having a part in the outer part of the curved part of the main pipe.

13. The equipped section of claim 10, wherein the means for measuring the quantity of water (Qwater) and the quantity of oil (Qoil) of the derived sample comprises:

an optical discriminator of oil, water and gas, the sensing tip thereof for discriminating between oil, water or gas, and being inserted in a passage of the liner or of a device connected to the liner having a diameter small enough for the derived sample being circulated in plugs thereof.

14. The equipped section of claim 10, wherein the optical discriminator is an Optical Probe Discriminator (OPD) adapted to discriminate between refractive indexes of oil water and gas by discriminating their respective refractive indexes.

15. The equipped section of claim 14, wherein the liner is in a seal connection with a Paul Guieze cell, the tip of the OPD being inserted in a passage of the cell and having the diameter small enough for the derived sample being circulated in plugs thereof.

16. The equipped section of claim 14, wherein an output of the liner is inside the equipped section.

17. The equipped section of claim 15, wherein an output of the Paul Guieze cell or an output of a liner connected to the output of the cell is inside the equipped section.

18. A method for determining an oil quantity from a multiphase flowmeter having a processing part of data acquired by a sensor part of a multiphase flowmeter, the method comprising:

introducing in the processing part a value representing GOR1 or WLR1;

processing the introduced value with data acquired by the sensing part of the multiphase flowmeter;

computing first and second relative errors, the first relative error for computing Qoil with the first member of the following equation:

$$Qoil_{LC} = (1 - WLR) \cdot Qtot_{LC} \cdot (1 - GVF) = Qtot_{LC} \frac{GVF}{GOR1}$$

and with the second relative error for computing Qoil with the second member of the equation, wherein the first and second members are on the two sides of the = sign in the equation, and determining a value of the relative errors in both cases;

choosing the member of the equation giving the lowest error rate; and computing Qoil with the chosen member to issue the value of Qoil.

* * * * *